United States Patent
Lee et al.

(10) Patent No.: US 9,350,192 B2
(45) Date of Patent: May 24, 2016

(54) ON-BOARD CHARGER FOR CHARGING ECO-FRIENDLY VEHICLE BATTERY

(71) Applicant: Hyundai Motor Company, Seoul (KR)

(72) Inventors: Dae Woo Lee, Gyeongsangbuk-do (KR); Byeong Seob Song, Gyeonggi-do (KR); Jin Young Yang, Gyeonggi-do (KR); Woo Young Lee, Chungcheongbuk-do (KR)

(73) Assignee: Hyundai Motor Company, Seoul (KR)

( * ) Notice: Subject to any disclaimer, the term of this patent is extended or adjusted under 35 U.S.C. 154(b) by 262 days.

(21) Appl. No.: 14/064,513

(22) Filed: Oct. 28, 2013

(65) Prior Publication Data

US 2014/0361750 A1  Dec. 11, 2014

(30) Foreign Application Priority Data

Jun. 10, 2013  (KR) .................. 10-2013-0065636

(51) Int. Cl.
*H01M 10/44* (2006.01)
*H01M 10/46* (2006.01)
*H02J 7/02* (2016.01)
*B60L 11/18* (2006.01)
*H02M 1/42* (2007.01)
*H02M 1/34* (2007.01)

(52) U.S. Cl.
CPC ............. *H02J 7/022* (2013.01); *B60L 11/1811* (2013.01); *H02M 1/4266* (2013.01); *B60L 2210/30* (2013.01); *B60L 2210/40* (2013.01); *H02M 1/34* (2013.01)

(58) Field of Classification Search
CPC ....... H02J 7/04; H02J 7/02; H02J 2007/0059; H02J 2007/0095

USPC .................................. 320/104, 128, 135, 140
See application file for complete search history.

(56) References Cited

U.S. PATENT DOCUMENTS

| | | | | |
|---|---|---|---|---|
| 2004/0264224 | A1* | 12/2004 | Jang ..................... | H02M 1/34 363/97 |
| 2005/0226015 | A1 | 10/2005 | Tsuruya | |
| 2005/0281059 | A1* | 12/2005 | Yasumura ........... | H02M 1/4241 363/16 |
| 2007/0035971 | A1* | 2/2007 | Yasumura ............. | H02M 1/12 363/21.02 |
| 2007/0051712 | A1* | 3/2007 | Kooken ................ | B23K 9/095 219/130.1 |

FOREIGN PATENT DOCUMENTS

| | | | |
|---|---|---|---|
| JP | 2002165453 | A | 6/2002 |
| JP | 2004147405 | A | 5/2004 |
| JP | 2011015495 | A | 1/2011 |
| JP | 2013-116021 | A | 6/2013 |
| KR | 10-2011-0019000 | | 2/2011 |
| WO | 2011161729 | A1 | 12/2011 |

* cited by examiner

*Primary Examiner* — Edward Tso
(74) *Attorney, Agent, or Firm* — Mintz Levin Cohn Ferris Glovsky and Popeo, P.C.; Peter F. Corless

(57) ABSTRACT

An on-board charger for charging a battery of an eco-friendly vehicle and a method for charging a battery using the on-board charger are provided. The on board charger reduces an output current ripple by improving a snubber circuit unit of the on-board charger for charging a battery in plug-in hybrid and electric vehicles. In addition, the on-board charger for charging a battery of an eco-friendly vehicle reduces a surge voltage generated in a rectifier diode and reduces an output current ripple by arranging two capacitors and three diodes in a transformer secondary rectifier of the on-board charger.

4 Claims, 5 Drawing Sheets

US 9,350,192 B2

ON-BOARD CHARGER FOR CHARGING ECO-FRIENDLY VEHICLE BATTERY

CROSS-REFERENCE TO RELATED APPLICATION

This application claims under 35 U.S.C. §119(a) the benefit of Korean Patent Application No. 10-2013-0065636 filed Jun. 10, 2013, the entire contents of which are incorporated herein by reference.

BACKGROUND (a) Technical Field

The present invention relates to an on-board charger for charging a battery of an eco-friendly vehicle. More particularly, the present invention relates to an on-board charger for charging a battery of an eco-friendly vehicle, that reduces an output current ripple by improving a snubber circuit unit of an on-board charger for charging a battery in plug-in hybrid and electric vehicles.

(b) Background Art

Generally, plug-in hybrid vehicles and electric vehicles, types of eco-friendly vehicles, include an on-board charger and a battery for power charging. A method for charging a battery using the on-board charger includes applying a home alternating current (AC) power to the on-board charger installed within a vehicle, generating a charging current by converting AC power into direct current (DC) power, and applying the charging current generated in the on-board charger to a high voltage battery for charging.

To increase the stability of charging operation of the on-board charger for the high voltage battery and prevent the reduction of the lifespan of the high voltage battery, a surge voltage of a rectifier diode included in the on-board charger should be minimized and the ripple of an output current should be reduced. To accomplish this, the on-board charger includes a snubber circuit unit.

Hereinafter, typical circuit configuration and operation of the on-board charger including the snubber circuit unit will be described with reference to FIGS. 1 and 2.

A typical on-board charger includes a power factor compensator 10, a full bridge input unit 20, a main transformer 30, a rectifier diode 40, a snubber circuit unit 50, an output inductor 60, an output capacitor 70, and a high voltage battery 80. The power factor compensator 10 is connected to an AC normal power supply and increases the use of effective power by compensating for the power factor of an AC input current to be equal to the power factor of an input voltage. The full bridge input unit 20 is connected to change a DC input voltage into an AC voltage. The main transformer 30 boosts an output voltage with respect to the AC voltage from the full bridge input unit 20, and secures insulation between a high voltage and a vehicle body. The rectifier diode 40 converts the AC voltage boosted in the main transformer 30 into an AC voltage. The snubber circuit unit 50 removes a surged high voltage generated the rectifier diode 40 is turned off. The output inductor 60 converts the output voltage into a DC voltage with a ripple reduced together with the output capacitor 70, and simultaneously reduces noise. The output capacitor 70 converts the output voltage into the DC voltage with a ripple reduced together with the output inductor 60, and simultaneously reduces noise. The high voltage battery 80 is charged with the DC voltage from the output capacitor 70.

Particularly, a typical snubber circuit unit 50, as shown in FIG. 1, includes one diode D1, one capacitor C1, and one resistor R1 between the output terminal of the rectifier diode 40 and the input terminal of the output inductor 60. In other words, the diode D1 and the capacitor C1 of the snubber circuit unit 50 are sequentially disposed between the output terminal of the rectifier diode 40 and the input terminal of the output inductor 60, and the resistor R1 is connected to the capacitor C1. Accordingly, a surge voltage generated upon turning off the rectifier diode 40 is charged to the capacitor C1 via the diode D1 of the snubber circuit unit 50, and the surge voltage charged in the capacitor C1 is discharged and removed via the resistor R1. However, when a significant heat loss occurs in the resistor R1, the snubber circuit may be damaged by burning, resulting in the destruction of the whole circuitry.

Another typical snubber circuit unit 50, as shown in FIG. 2, includes two diodes D1 and D2 and one capacitor C1 between the output terminal of the rectifier diode 40 and the output terminal of the output inductor 60. In other words, the snubber circuit unit 40 includes the second diode D2 that applies a voltage while forming a closed section from the output terminal of the output inductor 60 to the capacitor C1, in addition to the first diode D1 and the capacitor C1 that are sequentially arranged between the output terminal of the rectifier diode 40 and the output terminal of the output inductor 60.

Accordingly, the surge voltage generated upon turning off the rectifier diode 40 is charged into the capacitor C1 (black arrow of FIG. 2), and the surge voltage charged in the capacitor C1 is discharged to the capacitor C1 via the output inductor 60 and the second diode D2 as indicated as the white arrow of FIG. 2. However, in addition to the ripple of the output inductor 60, a current generated by the resonance of the capacitor C1 and transformer leakage inductances is added to be output to the output capacitor 70, and thus the current ripple flowing in the inductor may increase and a Root Mean Square (RMS) current may increase in the output capacitor 70, thus shortening the lifespan of the capacitor. In addition, the battery lifespan may also be affected by the increase of the ripple current at the high voltage battery.

The above information disclosed in this section is only for enhancement of understanding of the background of the invention and therefore it may contain information that does not form the prior art that is already known in this country to a person of ordinary skill in the art.

SUMMARY

The present invention provides an on-board charger for charging a battery of an eco-friendly vehicle that may reduce a surge voltage generated in a rectifier diode and reduce an output current ripple, by arranging two capacitors and three diodes in a transformer secondary rectifier of the on-board charger.

In one aspect, the present invention provides an on boar charger for charging a battery of an eco-friendly vehicle, including: a full bridge input unit connected to a power factor compensator connected to an AC normal power supply to convert a DC voltage into an AC voltage; a main transformer that boosts the AC voltage from the full bridge input unit; a rectifier diode that converts the AC voltage boosted by the main transformer into a DC voltage; a snubber circuit unit that removes a surged high voltage generated upon turning off the rectifier diode; an output inductor that converts an output voltage into a DC voltage with a ripple reduced together with an output capacitor; and the output capacitor that converts the output voltage into the DC voltage with the ripple reduced together with the output inductor, wherein the snubber circuit unit may include: first and second capacitors connected to an output terminal of the rectifier diode 40 to charge a surge voltage from the rectifier diode; and first to third diodes connected while forming a closed looped with the first and second capacitor to form a closed loop discharge path of surge voltages discharged from the first and second capacitors.

In an exemplary embodiment, the other end of the first capacitor may be connected to an anode of the first diode and a cathode of the third diode, and one end of the second capacitor may be connected to a cathode of the first diode and an anode of the second diode connected to one end of the inductor connected to an cathode thereof and the other end of the second capacitor may be connected to an anode of the third diode.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
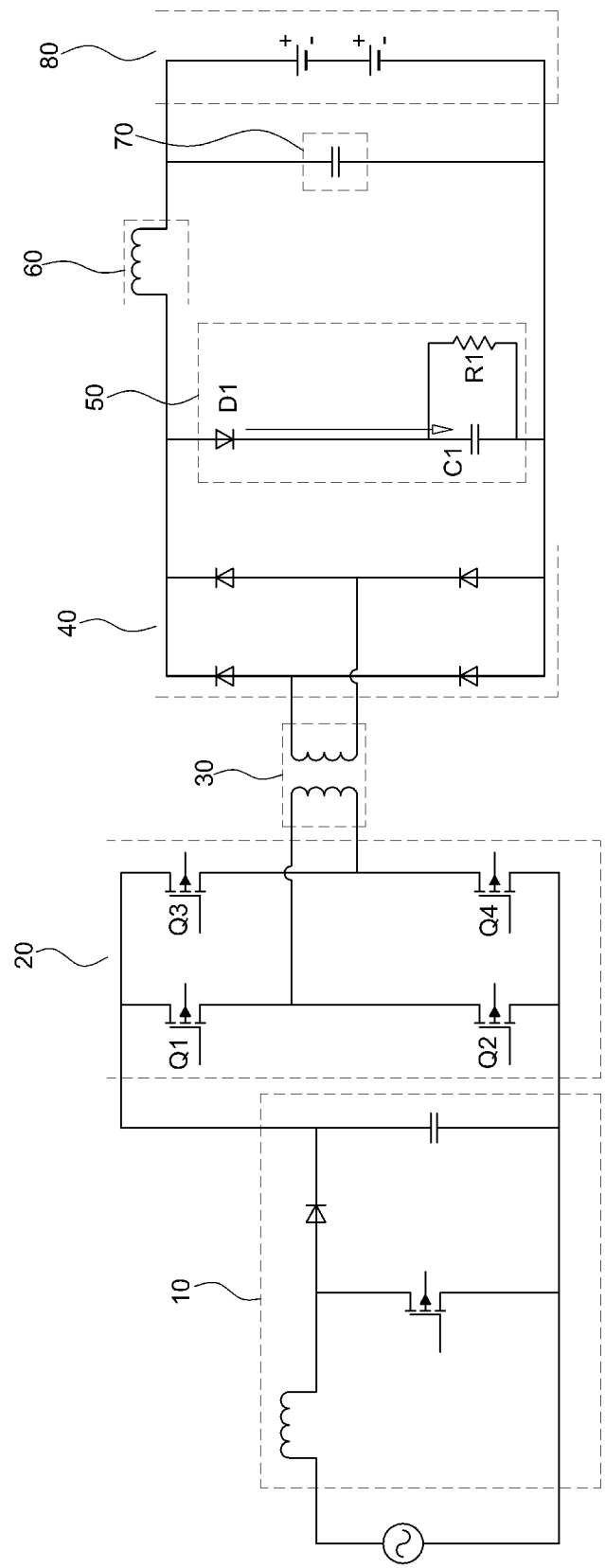
FIGS. 1 and 2 are exemplary circuit diagrams illustrating typical circuit configurations of an on-board charger according to the related art.

Reference numerals set forth in the Drawings includes reference to the following elements as further discussed below:

| | |
|---|---|
| 10: power factor compensator | 20: full bridge input unit |
| 30: main transformer | 40: rectifier diode |
| 50: snubber circuit unit | 60: output inductor |
| 70: output capacitor | 80: high voltage battery |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings.

As described above, eco-friendly vehicles, i.e., plug-in hybrid and electric vehicles may include an on-board charger to charge a high voltage battery thereof. A method for charging a battery using the on-board charger may include applying a home AC power to the on-board charger installed within a vehicle, generating a charging current by converting AC power into DC power, and applying the charging current generated in the on-board charger to a high voltage battery for charging.

The on-board charger may include a snubber circuit unit to reduce a ripple of an output current while minimizing a surge voltage of a rectifier diode and to prevent the lifespan reduction of the output capacitor and the high voltage battery.

Figure 3:
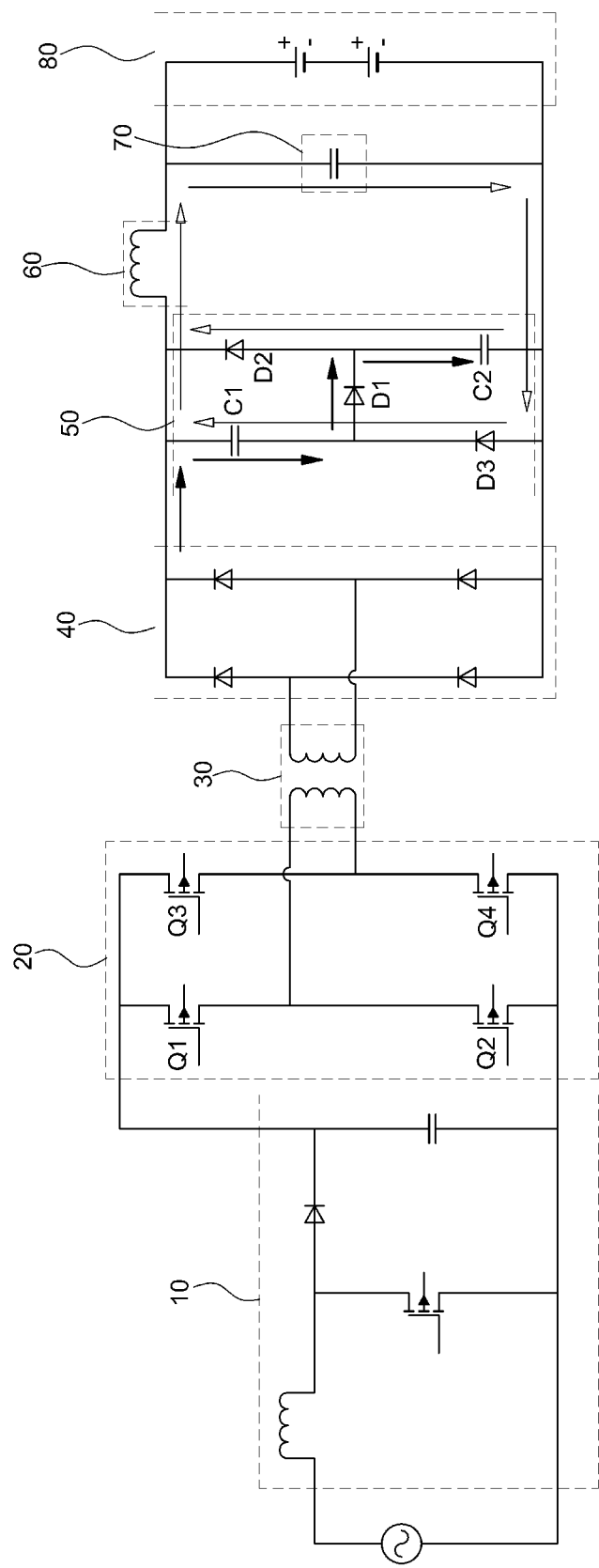
FIG. 3 is an exemplary circuit diagram illustrating an on-board charger for charging a battery of a plug-in hybrid or electric vehicle according to an exemplary embodiment of the present invention.

Referring to FIG. 3, an on-board charger according to an exemplary embodiment of the present invention may include a power factor compensator 10, a full bridge input unit 20, a main transformer 30, a rectifier diode 40, a snubber circuit unit 50, an output inductor 60, an output capacitor 70, and a high voltage battery 80. The power factor compensator 10 may be connected to an AC normal power supply and may increase the use of effective power by compensating for the power factor of an AC input current to be equal to the power factor of an input voltage. The full bridge input unit 20 may be connected within the on-board charger to change a DC input voltage into an AC voltage. The main transformer 30 may boost an output voltage with respect to the AC voltage from the full bridge input unit 20, and may secure insulation between a high voltage and a vehicle body. The rectifier diode 40 may convert the AC voltage boosted in the main transformer 30 into an AC voltage. The snubber circuit unit 50 may remove a surged high voltage generated upon turning off of the rectifier diode 40. The output inductor 60 may convert the output voltage into a DC voltage with a ripple reduced together with the output capacitor 70, and simultaneously may reduce noise. The output capacitor 70 may convert the output voltage into the DC voltage with a ripple reduced together with the output inductor 60, and simultaneously may reduce noise. The high voltage battery 80 may be charged with the DC voltage from the output capacitor 70.

The snubber circuit unit 50 may reduce a surge voltage generated in the rectifier diode 40 and reduce an output current ripple, through a snubber circuit configuration in which two capacitors and three diodes are arranged between the rectifier diode 40 that is a transformer secondary rectifier and the output inductor 60. In particular, the snubber circuit unit 50 may be connected to the output terminal of the rectifier diode 40 wherein the first capacitor C1 and the second capacitor C2 are disposed on a charge path for charging the surge voltage from the rectifier diode 40, and may include first to third diodes D1, D2 and D3 that are connected while forming a closed loop together with the first and second capacitors C1 and C2 as a discharge path of the surge voltage charged in the first and second capacitors C1 and C2.

One end of the first capacitor C1 may be connected to the output terminal of the rectifier diode 40, and the other end of the first capacitor C1 may be connected to both of the anode of the first diode D1 and the cathode of the third diode D3. In addition, the second capacitor C2 may be connected to the first capacitor C1 across the first and second diodes D1 and D2. One end of the second capacitor C2 may be connected to the cathode of the first diode D1 and the anode of the second diode D2, and the other end of the second capacitor C2 may be connected to the anode of the third diode D3. In particular, the cathode of the second diode D2 may be connected to the input terminal of the inductor 60.

In this snubber circuit configuration according to the exemplary embodiment of the present invention, the charge path for charging the surge voltage may lead in the order of the first capacitor C1, the first diode D2, and the second capacitor C2 as indicated as the black arrow of FIG. 3.

Figure 2:
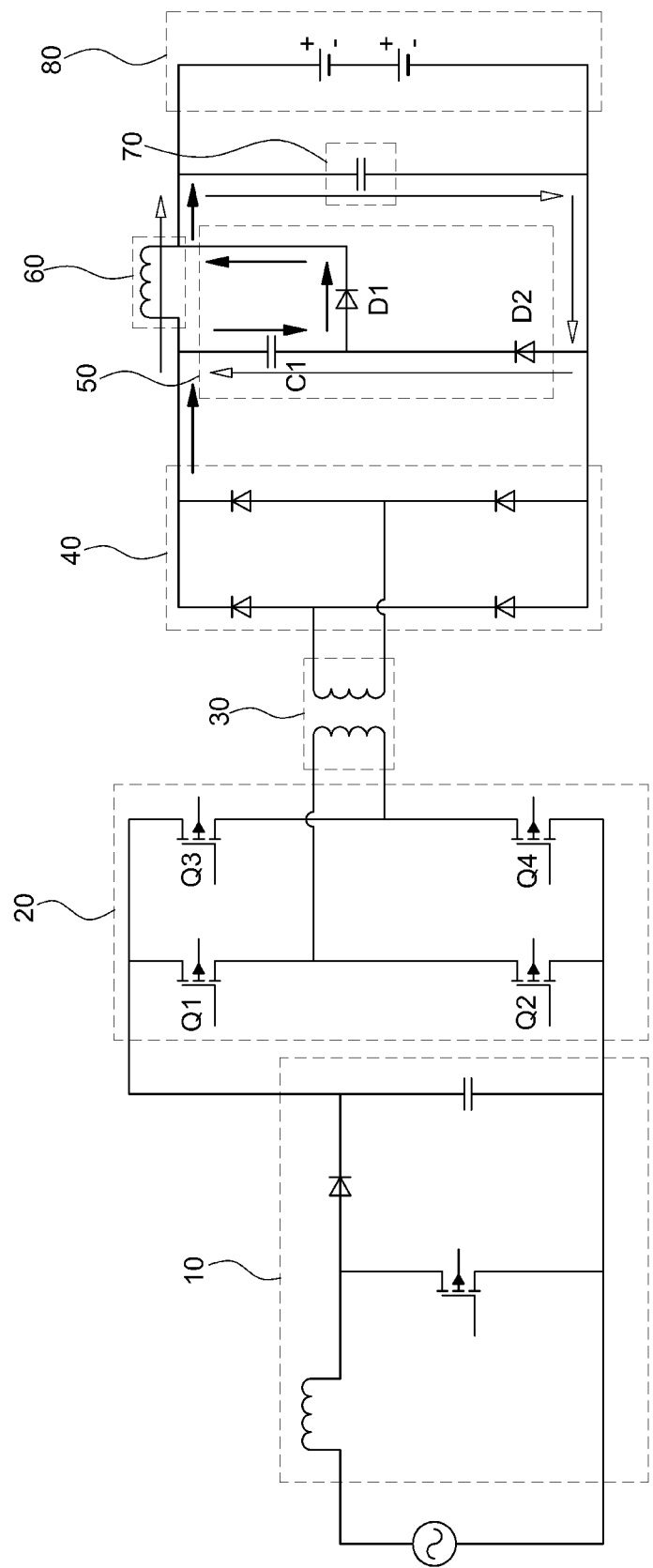

On the other hand, each discharge path of the first and second capacitors C1 and C2 may form a closed loop. More specifically, the discharge path of the first capacitor C1, as indicated as the white arrow of FIG. 3, may form a closed loop that sequentially circulates the positive (+) terminal of the first capacitor C1, the output inductor 60, the output capacitor 70, and the third diode D3, and the discharge path of the second capacitor C2, as indicated as the while arrow of FIG. 3, may form a closed loop that sequentially circulates the positive (+) terminal of the second capacitor C2, the second diode D2, the output inductor 60, and the output capacitor 70. Accordingly, the surge voltage generated upon turning off the rectifier diode 40 may be charged into the capacitor C1 (black arrow of FIG. 2), and simultaneously may be charged into the second capacitor C2 via the first diode D1 to be removed.

Moreover, upon normal operation of the rectifier diode (e.g., when failure does not occur), the surge voltage charged in the first capacitor C1 may be discharged from the positive (+) terminal of the first capacitor C1 to the output inductor 60 and the output capacitor 70, and the surge voltage charged in the second capacitor C2 may be discharged from the positive (+) terminal of the second capacitor C2 to the output inductor 60 and the capacitor 70 via the second diode D2. In particular, since only the ripple of the output inductor 60 is delivered to the output capacitor 70 that is an output terminal, the ripple of the final output current may be reduced more than a typical snubber circuit in which the ripple current increases due to the addition of a current generated by a resonance of the leakage inductances of the surge voltage charging/discharging capacitor and the inductor.

Figure 4:
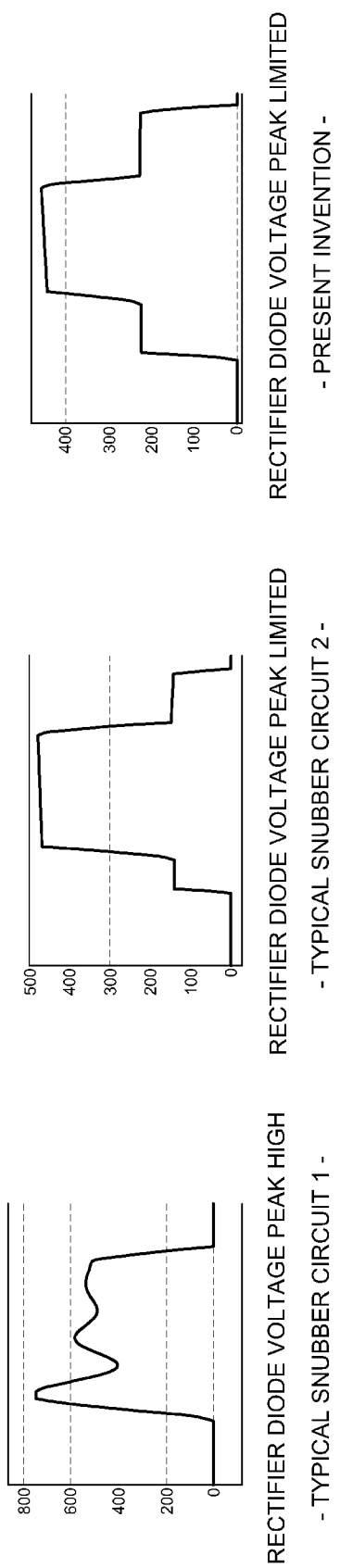
FIG. 4 is an exemplary waveform diagram illustrating voltages acting on diodes of typical snubber circuits and a snubber circuit according to an exemplary embodiment of the present invention.

As a result of a test example, FIG. 4 illustrates an exemplary waveform diagram of voltages acting on the diodes of typical snubber circuit (e.g., conventional snubber circuit of the related art) and the snubber according to the exemplary embodiment. Referring to FIG. 4, in an example of typical snubber circuits, the voltage (shown as typical snubber circuit 1) peak of the rectifier diode is shown as continuously high upon normal operation after the snubbing, but in another example of typical snubber circuits and the snubber according to the exemplary embodiment, the voltage peaks of the rectifier diodes are shown as being limited. Thus, it can be seen that a rectifier diode with a low voltage resistance may be used.

Figure 5:
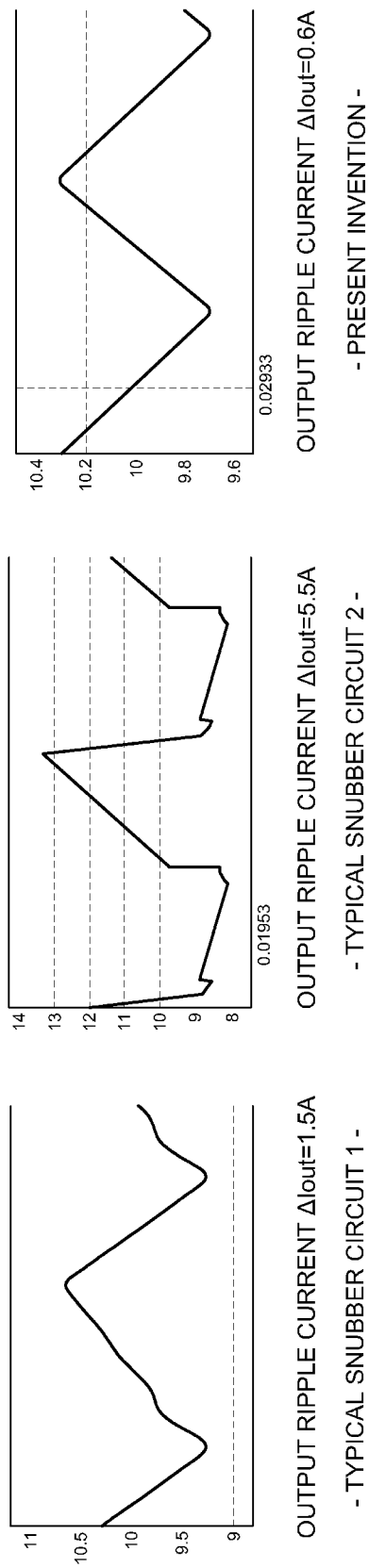
FIG. 5 is an exemplary waveform diagram illustrating output current ripples of typical snubber circuits and a snubber circuit according to an exemplary embodiment of the present invention.

As a result of another test example, FIG. 5 illustrates an exemplary waveform diagram of the output current ripples of typical snubber circuits and the snubber circuit according to the exemplary embodiment of the present invention. Referring to FIG. 5, the output current ripples of exemplary typical snubber circuits are shown as substantially high (e.g., about 1.5 A). Particularly, in another example of typical snubber circuits, the output current ripple (shown as typical snubber circuit 2) is shown as significantly high (e.g., about 5.5 A) due to the resonance, but the output ripple of the snubber circuit according to the exemplary embodiment of the present invention is shown as substantially low (e.g., about 0.6 A).

Thus, the snubber circuit according to the exemplary embodiment of the present invention, a surge voltage generated in the rectifier diode may be reduced, and the output current ripple may also be significantly reduced. In addition, the RMS current according to the reduction of the output ripple current may be reduced, and thus, the lifespan reduction of the output capacitor and the life span of the high voltage battery may be prevented.

According to an exemplary embodiment of the present invention, a surge voltage generated in a rectifier diode may be reduced and an output current ripple may be reduced through a snubber circuit configuration in which two capacitors and three diodes are arranged in a transformer secondary rectifier of an on-board charger for a plug-in hybrid or electric vehicle. Additionally, an RMS current according to the reduction of the output ripple current of the snubber circuit unit may be reduced, and thus the lifespan of the output capacitor and the lifespan of the high voltage battery may increase, thereby saving the cost.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. An on board charger for charging a battery of a vehicle, comprising:
    a full bridge input unit connected to a power factor compensator connected to an alternating current (AC) normal power supply to convert a direct current (DC) voltage into an AC voltage;
    a main transformer that boosts the AC voltage from the full bridge input unit;
    a rectifier diode that converts the AC voltage boosted by the main transformer into a DC voltage;
    a snubber circuit unit that removes a surged high voltage generated upon turning off the rectifier diode;
    an output inductor that converts an output voltage into a DC voltage with a ripple reduced together with an output capacitor; and
    the output capacitor that converts the output voltage into the DC voltage with the ripple reduced together with the output inductor,
    wherein the snubber circuit unit includes:
        a first capacitor and a second capacitor connected to an output terminal of the rectifier diode to charge a surge voltage from the rectifier diode; and
        a first diode, a second diode, and a third diode connected while forming a closed looped with the first capacitor and the second capacitor to form a closed loop discharge path of surge voltages discharged from the first capacitor and the second capacitor.

2. The on-board charger of claim 1, wherein one end of the first capacitor is connected to an anode of the first diode and a cathode of the third diode, and one end of the second capacitor is connected to a cathode of the first diode and an anode of the second diode connected to one end of the inductor connected to an cathode thereof and the other end of the second capacitor is connected to an anode of the third diode.

3. A method for charging a battery using an on-board charger, comprising:
    applying an alternating current (AC) power to the on-board charger installed within a vehicle;
    generating a charging current by converting the AC power into direct current (DC) power; and
    applying the charging current generated in the on-board charger to a high voltage battery for charging,
    wherein the on board charger includes a snubber circuit unit having a first capacitor and a second capacitor connected to an output terminal of a rectifier diode to charge a surge voltage form the rectifier diode and a first diode, a second diode, and a third diode connected while forming a closed loop with the first capacitor and the second capacitor to form a closed loop discharge path of surge voltages discharged from the first capacitor and the second capacitor.

4. The method of claim 3, wherein one end of the first capacitor is connected to an anode of the first diode and a cathode of the third diode, and one end of the second capacitor is connected to a cathode of the first diode and an anode of the second diode connected to one end of the inductor connected to an cathode thereof and the other end of the second capacitor is connected to an anode of the third diode.

* * * * *